(12) United States Patent
Ryou et al.

(10) Patent No.: US 10,938,072 B2
(45) Date of Patent: Mar. 2, 2021

(54) ZINC-AIR SECONDARY BATTERY

(71) Applicant: E.M.W. ENERGY CO., LTD., Seoul (KR)

(72) Inventors: Byoung Hoon Ryou, Seoul (KR); Jae Kyung Kong, Seoul (KR)

(73) Assignee: E.M.W.ENERGY CO., LTD, Seoul (KR)

( * ) Notice: Subject to any disclaimer, the term of this patent is extended or adjusted under 35 U.S.C. 154(b) by 9 days.

(21) Appl. No.: 16/077,585

(22) PCT Filed: Feb. 8, 2017

(86) PCT No.: PCT/KR2017/001360
§ 371 (c)(1),
(2) Date: Aug. 13, 2018

(87) PCT Pub. No.: WO2017/138738
PCT Pub. Date: Aug. 17, 2017

(65) Prior Publication Data
US 2019/0051948 A1    Feb. 14, 2019

(30) Foreign Application Priority Data

Feb. 12, 2016  (KR) .................. 10-2016-0016361

(51) Int. Cl.
*H01M 10/42* (2006.01)
*H01M 12/08* (2006.01)
(Continued)

(52) U.S. Cl.
CPC ......... *H01M 10/4214* (2013.01); *H01M 2/36* (2013.01); *H01M 2/38* (2013.01);
(Continued)

(58) Field of Classification Search
None
See application file for complete search history.

(56) References Cited

U.S. PATENT DOCUMENTS 3,887,400 A * 6/1975 Doniat .................. H01M 8/225
                                                 429/404
4,862,540 A * 9/1989 Savenije ............... A47C 27/148
                                                   5/718
(Continued)

FOREIGN PATENT DOCUMENTS

EP       2827437 A1    1/2015
JP     2010-267476 A  11/2010
(Continued)

OTHER PUBLICATIONS

International Search Report for PCT/KR2017/001360 dated May 29, 2017.
(Continued)

*Primary Examiner* — Ula C Ruddock
*Assistant Examiner* — Amanda Rosenbaum
(74) *Attorney, Agent, or Firm* — The PL Law Group, PLLC

(57) ABSTRACT

A zinc-air secondary battery includes an air positive electrode part, a separator, and a zinc gel negative electrode part in a case, provided with an electrolyte flow part for inducing electrolyte to flow inside the zinc gel negative electrode part. The oxygen discharging efficiency that remains in the zinc gel negative electrode part and is not smoothly discharged to the outside can be improved, and thus charging performance of the zinc-air secondary battery can be improved.

2 Claims, 1 Drawing Sheet

(51) Int. Cl.
    *H01M 2/36*     (2006.01)
    *H01M 2/40*     (2006.01)
    *H01M 4/134*     (2010.01)
    *H01M 2/38*     (2006.01)
    *H01M 4/02*     (2006.01)

(52) U.S. Cl.
    CPC ............. *H01M 2/40* (2013.01); *H01M 4/134* (2013.01); *H01M 12/08* (2013.01); *H01M 2004/023* (2013.01); *H01M 2004/027* (2013.01); *Y02E 60/10* (2013.01)

(56) References Cited

U.S. PATENT DOCUMENTS

2002/0142203 A1* 10/2002 Ma .......................... H01M 4/06
    429/406
2013/0285597 A1* 10/2013 Goldstein ............. H02J 7/0052
    320/107
2015/0372297 A1* 12/2015 Kameyama ........... H01M 12/08
    429/406

FOREIGN PATENT DOCUMENTS

| | | |
|---|---|---|
| JP | 2013-179043 A | 9/2013 |
| KR | 10-0859957 B1 | 9/2008 |
| KR | 10-0994438 B1 | 11/2010 |
| KR | 10-2012-0070729 A | 7/2012 |

OTHER PUBLICATIONS

Notice of Allowance dated Nov. 13, 2017 from Korean Patent Office in a counterpart Korean Patent Application No. 10-2016-0016361 (English translation is also submitted herewith.).

\* cited by examiner

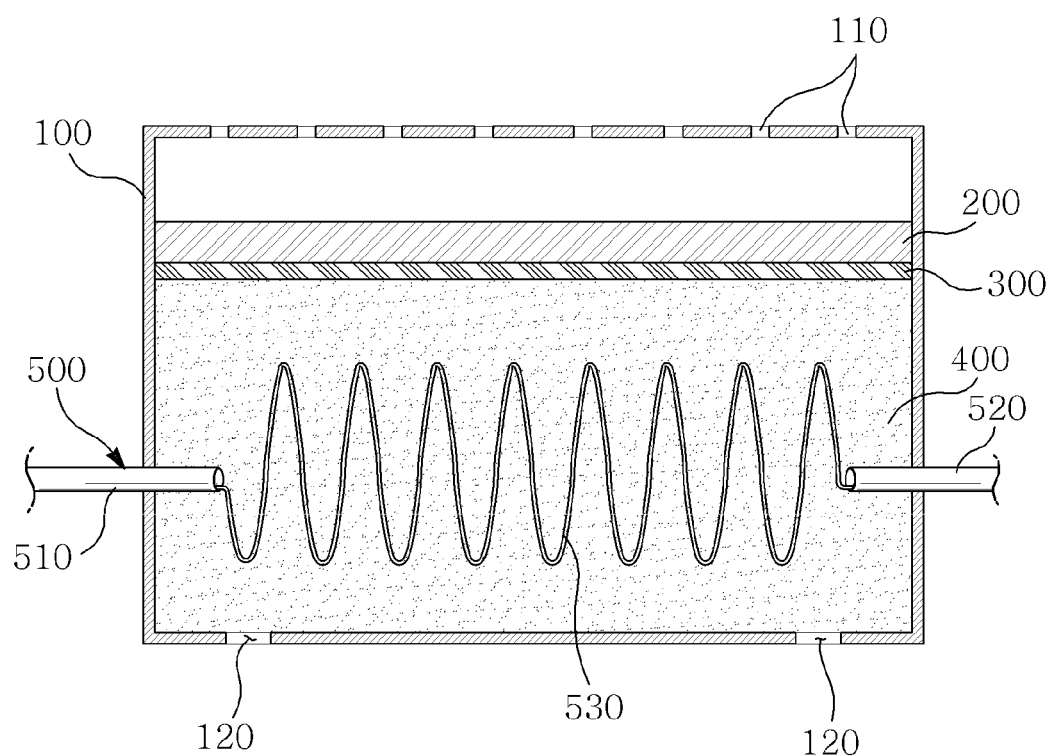

ZINC-AIR SECONDARY BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/001360, filed Feb. 8, 2017, which claims priority to the benefit of Korean Patent Application No. 10-2016-0016361 filed in the Korean Intellectual Property Office on Feb. 12, 2016, the entire contents of which are incorporated herein by reference.

TECHNICAL FIELD

The present invention relates to a zinc-air secondary battery having high oxygen-discharging efficiency.

BACKGROUND

An electrochemical power source is a device in which electric energy can be generated by an electrochemical reaction, and to which a zinc-air secondary battery also corresponds. The zinc-air secondary battery employs a zinc gel negative electrode part made of a zinc gel to be converted into a zinc oxide during discharging and an air positive electrode part having a shape of a layer that is a permeable layer including water molecules and in contact with oxygen present in the air to generate hydroxyl ions.

Such a zinc-air secondary battery has many advantages compared to a hydrogen fuel battery according to the related art. In particular, because a rich fuel such as zinc (Zn) is present as metal or an oxide thereof, the supply of energy supplied from the zinc-air secondary battery is not visibly depleted. Also, hydrogen fuel batteries according to the related art are required to be re-filled, whereas the zinc-air secondary battery can be electrically re-charged and used and can transmit a higher output voltage of 1.4V than general fuel batteries having a voltage of less than 0.8V.

Accordingly, in the zinc-air secondary battery that is chargeable/dischargeable, as discharging is carried out, Zn of the zinc gel negative electrode part gradually becomes a zinc oxide, and during charging, oxygen present in the zinc oxide is separated and discharged and returns to original zinc. That is, when discharging is sufficiently performed, the higher the oxygen-discharging efficiency of the zinc gel negative electrode part, the higher the charging performance of the zinc-air secondary battery.

However, in a zinc-air secondary battery according to the related art, oxygen present in the zinc gel negative electrode part is not smoothly discharged during charging, and in order to improve the charging performance of the zinc-air secondary battery, it is significant to improve discharging efficiency of oxygen that is present in the zinc gel negative electrode part.

SUMMARY

The present invention is directed to providing a zinc-air secondary battery that is capable of effectively discharging oxygen present in a zinc gel negative electrode part.

One aspect of the present invention provides a zinc-air secondary battery, and more particularly, a zinc-air secondary battery, which includes an air positive electrode part, a separator, and a zinc gel negative electrode part in a case, provided with an electrolyte flow part for inducing an electrolyte to flow inside the zinc gel negative electrode part.

In a zinc-air secondary battery according to the present invention, an electrolyte flows inside a zinc gel negative electrode part through an electrolyte flow part so that oxygen discharging efficiency that remains in the zinc gel negative electrode part and is not smoothly discharged to the outside, can be improved, and thus charging performance of the zinc-air secondary battery according to the present invention can be improved.

BRIEF DESCRIPTION OF THE DRAWINGS

FIG. 1 is a lateral cross-sectional view for illustrating a structure of a zinc-air secondary battery according to the present invention.

DETAILED DESCRIPTION

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

The terminology used herein is for the purpose of describing particular embodiments only and is not intended to be limiting to the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components, and/or groups thereof but do not preclude the presence or addition of one or more other features, integers, steps, operations, elements, components, and/or groups thereof.

While such terms as "first," "second," etc., may be used to describe various components, such components must not be limited to the above terms. The above terms are used only to distinguish one component from another.

The present invention relates to a zinc-air secondary battery, and more particularly, to a zinc-air secondary batter including an air positive electrode part, a separator, and a zinc gel negative electrode part in a case, provided with an electrolyte flow part for inducing electrolyte to flow inside the zinc gel negative electrode part.

In the present invention, the air positive electrode part includes an air diffusion layer, a catalyst active layer, and a positive electrode collector layer, as generally known, and preferably, the air diffusion layer may be formed of a hydrophobic layer material, such as polytetrafluoroethylene (PTFE), so as to extend a life-span of the zinc-air secondary battery by preventing moisture and carbon dioxide ($CO_2$) in the external air from being introduced into the zinc-air secondary battery, and the catalyst active layer is formed of a carbon material that causes a reaction of the following Formula 1 by reacting with introduced oxygen, and preferably, the positive electrode collector layer that collects electrons generated by the chemical reaction of the catalyst active layer may have a mesh structure formed of a conductive material, such as metal.

$$O_2 + 2H_2O + 4e^- \leftrightarrow 4OH^-$$ [Formula 1]

In the present invention, because the separator that is interposed between the air positive electrode part and the zinc gel negative electrode part so as to prevent a short circuit between the air positive electrode part and the zinc gel negative electrode part, is required to transmit hydroxyl ions generated by a chemical reaction with oxygen present in the catalyst active layer of the air positive electrode part to the zinc gel negative electrode part, preferably, the separator may be formed of a material having ion permeability, such as polypropylene.

In the present invention, the zinc gel negative electrode part that includes a zinc gel having a shape of a gel in which zinc (Zn) and an electrolyte are mixed with each other, causes a reaction of the following Formula 2 and functions as a negative electrode.

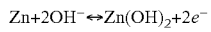

 [Formula 2]

Through the reaction of the above Formula 2, water molecules are generated in the zinc gel negative electrode part, and the water molecules generated through the reaction are moved to the air positive electrode part and are used in the chemical reaction of the above Formula 1.

In the present invention, the electrolyte flow part induces the electrolyte to flow inside the zinc gel negative electrode part. The zinc-air secondary battery according to the present invention induces the electrolyte to flow inside the zinc gel negative electrode part through the electrolyte flow part so that oxygen that remains in the zinc gel negative electrode and is not easily discharged, can be discharged to the outside together with the flowing electrolyte.

The electrolyte flow part may have any structure in which a flow path of the electrolyte is formed so that the electrolyte flows inside the zinc gel negative electrode part, and for example, the electrolyte flow part may include: an electrolyte inflow part configured to induce the electrolyte to be introduced into the zinc gel negative electrode part; a guide channel part having an end of one side coupled and connected to an end of the electrolyte inflow part and configured to guide flow so that the electrolyte introduced through the electrolyte inflow part flows inside the zinc gel negative electrode part in a predetermined route; and an electrolyte outflow part coupled and connected to an end of the other side of the guide channel part and configured to induce the electrolyte flowing via the guide channel part to be discharged to the outside.

When the guide channel part has a structure in which the flow is guided so that the electrolyte introduced through the electrolyte inflow part flows inside the zinc gel negative electrode part in a predetermined route, the structure of the guide channel part is not specifically limited. However, in order to evenly discharge oxygen that remains in the whole of the zinc gel negative electrode part to the outside, the guide channel part may have a spring-shaped wire structure.

In addition, a material of the guide channel part is a conductor or a semiconductor and is not specifically limited. However, preferably, the guide channel part may be formed of a material having elasticity so as to flexibly correspond to expansion and contraction of the zinc gel negative electrode part due to repeated charging/discharging of the zinc-air secondary battery according to the present invention.

The zinc-air secondary battery according to the present invention induces the electrolyte to flow inside the zinc gel negative electrode part through the electrolyte flow part so that oxygen discharging efficiency that remains in the zinc gel negative electrode part and is not smoothly discharged to the outside, can be improved and thus charging performance of the zinc-air secondary battery can be improved.

Hereinafter, for understanding of the present invention, an example illustrated in the drawings will be described. However, the example illustrated in the following drawings is just an example for explaining the present invention, and the scope of the invention is not limited thereby.

FIG. 1 is a lateral cross-sectional view for illustrating a structure of a zinc-air secondary battery according to the present invention. Referring to FIG. 1, the zinc-air secondary battery according to an example of the present invention includes an air positive electrode part 200 and a zinc gel negative electrode part 400 within a case 100, and a separator 300 is interposed between the air positive electrode part 200 and the zinc gel negative electrode part 400.

In addition, a plurality of air holes 110 are formed in an upper portion of the case 100 so that the external air can be introduced into the zinc-air secondary battery through the plurality of air holes 110, and a terminal exposure part 120 is formed at a lower portion of the case 100.

Referring to FIG. 1, an electrolyte flow part 500 includes an electrolyte inflow part 510 configured to pass through one area of the case 100 and having a tubular shape in which the electrolyte is introduced into the zinc gel negative electrode part 400, an electrolyte outflow part 520 configured to pass through another area of the case 100 and to induce the electrolyte flowing inside the zinc gel negative electrode part 400 to be discharged to the outside, and a guide channel part 530 placed between the electrolyte inflow part 510 and the electrolyte outflow part 520 and having a spring-shaped wire structure in which flow is guided so that the electrolyte introduced through the electrolyte inflow part 510 flows inside the zinc gel negative electrode part 400 in a predetermined route.

According to an embodiment of the present invention illustrated in FIG. 1, the electrolyte is introduced into the zinc gel negative electrode part 400 through the electrolyte inflow part 510 of the electrolyte flow part 500, flows inside the zinc gel negative electrode part 400 through the guide channel part 530 having a spring-shaped wire structure connected to an end of the electrolyte inflow part 510, collects oxygen that remains in the zinc gel negative electrode part 400 and is discharged to the outside through the electrolyte outflow part 520 together with oxygen.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. A zinc-air secondary battery comprising:
an air positive electrode part;
a zinc gel negative electrode part including a zinc gel and an electrolyte, which are in a case, provided with an electrolyte flow part for inducing the electrolyte to flow inside the zinc gel negative electrode part; and
a separator interposed between the air positive electrode part and the zinc gel negative electrode part,
wherein the electrolyte flow part comprises:
an electrolyte inflow part to induce the electrolyte to be introduced into the zinc gel negative electrode part;
a guide channel part positioned in the middle of the zinc gel negative electrode part, the guide channel part to guide the induced electrolyte, the guide channel part having an end of one side coupled and connected to an end of the electrolyte inflow part and configured to guide an electrolyte flow so that the electrolyte introduced through the electrolyte inflow part is flown inside the zinc gel negative electrode part in a predetermined route; and an electrolyte outflow part coupled and connected to an end of the other side of the guide channel part and configured to induce the electrolyte flowing via the guide channel part to be discharged to the outside, wherein the guide channel part has a spring-shaped wire structure.

2. The zinc-air secondary battery of claim 1, wherein the guide channel part is formed of a material having elasticity.

* * * * *